2,975,179
Patented Mar. 14, 1961

2,975,179
PROCESS FOR THE PRODUCTION OF NUCLEARLY FLUORINATED PYRIDINES, QUINOLINES, ISOQUINOLINES, AND PYRIMIDINES

Alfons Dorlars, Leverkusen, Germany, assignor to Farbenfabriken Bayer Aktiengesellschaft, Leverkusen, Germany, a corporation of Germany No Drawing. Filed Aug. 20, 1958, Ser. No. 756,080

Claims priority, application Germany Aug. 27, 1957

5 Claims. (Cl. 260—251)

This invention relates to nuclearly fluorinated N-heterocyclic compounds and to a process for their production.

It has been found that nuclearly fluorinated N-heterocyclic compounds are obtained if N-heterocyclic compounds which are substituted in the nitrogenous ring in the α-position or γ-position by one or more hydroxy groups, and if desired contain further substituents, or their tautomeric carbonyl compounds are reacted with 2,4,6-trifluoro-1,3,5-triazine (cyanuric fluoride).

Heterocyclic compounds suitable for the process of the invention are for example 2-hydroxy-pyridine (α-pyridone), 2-hydroxy-quinoline and its nuclearly substituted derivatives, such as for example 6-chloro-carbostyrile or 6-methoxy-carbostyrile, 4-hydroxy-quinoline (quinolone), 4-methyl-2-hydroxy-quinoline (lepidone), 2,4-dihydroxyquinoline, 2-methyl-4-hydroxy-quinoline (quinaldone), 1,3-dihydroxy-isoquinoline, 2- or 4-hydroxy-pyrimidine and others.

The 2,4,6-trifluoro-1,3,5-triazine can be obtained by, for example, reacting cyanuric chloride, cyanuric bromide or cyanuric iodide with hydrogen fluoride or with neutral or acid fluorides.

When using the process according to the invention, it is necessary to use at least ⅓ mol of cyanuric fluoride per mol of hydroxyl group for the reaction. It is, however, frequently advisable to use an excess of cyanuric fluoride. The reaction is in this case preferably carried out in an inert solvent or diluent, such as for example benzine, benzene, xylene, chlorobenzene, tetrachlorethane or also excess cyanuric fluoride. Temperatures in the range between 50 and 220° C. are generally particularly suitable. If it is desired, the reaction can also be carried out under pressure. The working up of the resulting reaction products can take place after removal of any solvent or excess cyanuric fluoride which may be present and after hydrolysis of any fluoro-triazines which may still be present, the removal thereof being effected by known methods, for example by steam distillation, extraction or crystallisation.

The fluorine compounds which can be produced by the new process can be used as plant protecting agents or for the production of dyes, pharmaceutical products or plant-protecting agents.

The following examples further illustrate the invention without, in any way, limiting it thereto.

Example 1

A mixture of 95.5 grams (0.6 mol) of lepidone-(2) and 54 grams (0.4 mol) of cyanuric fluoride are heated in an autoclave for 1½ hours to 175° C. The mixture is allowed to cool, the semi-solid reaction product is stirred with excess soda solution and subjected to steam distillation. The colorless oil distilling over is separated from the distillate, dried with anhydrous sodium sulfate and distilled at reduced pressure. There is obtained a good yield of 2-fluoro-lepidine with a B.P.$_{16}$ of 140° C.

$C_{10}H_8FN$ (molecular weight 161.2): Calculated: C, 74.50; H, 5.00; F, 11.79; N, 8.69. Found: C, 74.20; H, 5.18; F, 11.70; N, 8.85.

Example 2

48 grams (0.3 mol) of quinaldone-(4) are heated with 27 grams (0.2 mol) of cyanuric fluoride in a glass flask with exclusion of moisture for 1 to 1½ hours on a water bath to 80 to 90° C. The brown-colored reaction product is worked up as indicated in Example 1. The 4-fluoro-quinaldine is obtained by steam distillation in the form of its hydrate as a crystalline colorless mass. It is filtered off, dissolved in ether, the solution is dried with sodium sulfate and the ether is distilled off. The residual oil is purified by distillation; B.P.$_{16}$ of 114° C.

On standing in moist air, the liquid 4-fluoro-quinaldine gradually changes into its crystallised hydrate.

$C_{10}H_8FN$ (molecular weight 161.2): Calculated: C, 74.50; H, 5.00; F, 11.79; N, 8.69. Found: C, 74.61; H, 5.08; F, 11.68; N, 8.71.

An aqueous dilution of the above compound was prepared by mixing the 4-fluoro-quinaldine with the same amount of dimethylformamide as an auxiliary solvent, adding thereto 20% by weight referred to the 4-fluoro-quinaldine of a commercial emulsifier consisting of a benzyl hydroxy polyglycol ether containing about 10 to 15 glycol residues. This mixture was diluted with water to a 0.2% by weight content of the 4-fluoro-quinaldine. The activity of the 4-fluoro-quinaldine as plant protecting agent was then tested against spider mites in the following manner:

Bean plants (*Phaseolus vulgaris*) of about 50 inches' hight were sprayed drip wet with the above-described 0.2% aqueous solution of 4-fluoro-quinaldine. The bean plants have been infested heavily with the two-spotted spider (species *Tetranychus telarius*). An evaluation was carried out after 24 hours whereby a killing rate of 90% was observed.

Example 3

28.5 grams (0.3 mol pyridone-(2) are heated with 20.3 grams (0.15 mol) of cyanuric fluoride for 1½ hours to 170 to 175° C. in an autoclave (volume 200 ml.). A pressure of approximately 10 atm. is adjusted. After cooling, the semi-solid residue is made alkaline with 10% sodium carbonate solution and subjected to steam distillation. The colorless oil distilling over is extracted with ether, the ethereal phase is separated and dried with anhydrous sodium sulfate. After evaporating the ether, the residual crude 2-fluoro-pyridine is distilled. In this way, it is obtained in a pure form as a colorless oil with a B.P.$_{760}$ of 126° C.

Example 4

48.3 grams (0.3 mol) of 4-hydroxy-quinolone-(2) are heated with 54 grams (0.4 mol) of cyanuric fluoride in an autoclave for 1 hour at 195° C. After cooling, the reaction product is triturated with soda solution and the 2,4-difluoro-quinoline being formed is distilled from the mixture by means of steam. The condensate is extracted with ether, the ether is dried and worked up according to the process of Example 3. 2,4-difluoro-quinoline is a colorless oil with a B.P.$_{11}$ of 91.5° C.

$C_9H_5F_2N$ (molecular weight 165.1): Calculated: C, 65.47; H, 3.05; F, 23.02; N, 8.48. Found: C, 65.70; H, 3.35; F, 22.94; N, 8.29.

Example 5

48.3 grams (0.3 mol) of 1,3-dihydroxy-isoquinoline are heated at 165° C. for 1 hour in an autoclave with 54 grams (0.4 mol) of cyanuric fluoride. The reaction mixture is worked up as described in Example 4. 1,3-difluoro-isoquinoline is obtained as a colorless oil which at once solidifies as crystals. B.P.$_{14}$ of 112° C., melting point 57° C.

$C_9H_5F_2N$ (molecular weight 165.1): Calculated: C, 65.47; H, 3.05; F, 23.02; N, 8.48. Found: C, 65.42; H, 3.15; F, 23.07; N, 8.48.

I claim:

1. Process for the production of N-heterocyclic compounds fluorinated in the nitrogen-containing ring, said fluorine atoms occupying at least one of the α- and γ-positions relative to said nitrogen atom, which comprises heating an N-heterocyclic compound which is a member selected from the group consisting of 2-hydroxy-pyridine, 2-hydroxy-quinoline, 4-hydroxy-quinoline, 4-methyl-2-hydroxy-quinoline, 2,4-dihydroxy-quinoline, 2-methyl-4-hydroxy-quinoline, 1,3 - dihydroxy-iso-quinoline, 2-hydroxy-pyrimidine, 4-hydroxy-pyrimidine, 2 - hydroxy - 6 - chloro-quinoline, 2-hydroxy - 6 - methoxy-quinoline and 2-hydroxy-pyridine with an amount of 2,4,6-trifluoro-1,3,5-triazine, representing at least one third of a mol per mol of each hydroxyl group to be replaced in said N-heterocyclic compound, at a temperature of from about 40 to 220° C., and recovering the corresponding nuclearly fluorinated N-teterocyclic compound formed by replacement of at least one of the hydroxyl groups with fluorine.

2. Process according to claim 1, in which the heating is effected at a temperature between 50 and 220° C.

3. Process according to claim 1, in which the heating is effected in the presence of an inert hydrocarbon solvent.

4. Process according to claim 1, in which an excess of 2,4,6-trifluoro-1,3,5-triazine is used.

5. Process according to claim 1, in which said N-heterocyclic group member is present in its tautomeric form.

References Cited in the file of this patent

UNITED STATES PATENTS

| | | |
|---|---|---|
| 2,742,479 | Bavley et al. | Apr. 17, 1956 |
| 2,802,005 | Heidelberger et al. | Aug. 6, 1957 |
| 2,810,706 | Frazier et al. | Oct. 22, 1957 |
| 2,838,514 | Surrey et al. | June 10, 1958 |
| 2,875,126 | Hodel et al. | Feb. 24, 1959 |

OTHER REFERENCES

Roe et al.: Journal of the American Chemical Society, vol. 71, pp. 1785–1786 (1949).

Miller et al.: Journal of the American Chemical Society, vol. 72, pp. 1629–1633 (1950).

Miller et al.: Journal of the American Chemical Society, vol. 72, pp. 4765–4767 (1950).

Knight et al.: Journal of the American Chemical Society, vol. 74, pp. 1599–1601 (1952).

UNITED STATES PATENT OFFICE

CERTIFICATE OF CORRECTION

Patent No. 2,975,179  March 14, 1961

Alfons Dorlars

It is hereby certified that error appears in the above numbered patent requiring correction and that the said Letters Patent should read as corrected below.

Column 1, line 72, and column 2, lines 17 and 63, for ":", first occurrence, each occurrence, read -- ; --; same column 2, line 28, for "activtiy" read -- activity --; column 3, line 3, for ":", first occurrence, read -- ; --; line 23, for "N-teterocyclic" read -- N-heterocyclic --.

Signed and sealed this 3rd day of October 1961.

(SEAL)
Attest:

ERNEST W. SWIDER
Attesting Officer

DAVID L. LADD
Commissioner of Patents
USCOMM-DC